United States Patent [19]
Lee

[11] Patent Number: 5,497,365
[45] Date of Patent: Mar. 5, 1996

[54] LASER DISC PLAYER CAPABLE OF PLAYING DIFFERENT TYPES OF DISCS

[75] Inventor: Su K. Lee, Seoul, Rep. of Korea

[73] Assignee: Samsung Electronics Co., Ltd., Kyungki-do, Rep. of Korea

[21] Appl. No.: 117,620

[22] Filed: Sep. 8, 1993

[30] Foreign Application Priority Data

Sep. 8, 1992 [KR] Rep. of Korea ...................... 92-16651

[51] Int. Cl.⁶ ........................ G11B 17/03; G11B 17/035
[52] U.S. Cl. ............................................. 369/75.2; 369/37
[58] Field of Search ........................ 369/34, 36, 37–38, 369/75.2, 77.1, 178, 191, 192, 194, 196, 258; 360/98.01, 98.04, 98.08

[56] References Cited

U.S. PATENT DOCUMENTS

| | | | |
|---|---|---|---|
| 5,043,963 | 8/1991 | Iwamoto | 369/36 |
| 5,245,602 | 9/1993 | Ikedo et al. | 369/75.2 |
| 5,270,989 | 12/1993 | Kimura | 369/37 |
| 5,341,352 | 8/1994 | Isobe | 369/37 |

FOREIGN PATENT DOCUMENTS

| | | |
|---|---|---|
| 4-44661 | 2/1992 | Japan . |
| 4-44662 | 2/1992 | Japan . |

Primary Examiner—Robert S. Tupper
Assistant Examiner—Paul J. Ditmyer
Attorney, Agent, or Firm—Sughrue, Mion, Zinn, Macpeak & Seas

[57] ABSTRACT

A laser disc player is coupled with a compact disc replacing device, so that the laser disc or a plurality of the compact discs can be selectively reproduced. Further, the laser disc player includes a sub-tray placed on a main tray and capable of loading at least two or more compact discs, and a disc selector for selectively playing the discs of the sub-tray. The disc selector includes a rack gear mounted on a side of the sub-tray, a pinion gear meshed with the rack gear, and a cam gear. These components are arranged in such a manner that the compact discs of the sub-tray are moved to the center of a turntable. Thus, the sub-tray is moved, and a pick-up is focused on the disc to play it.

5 Claims, 7 Drawing Sheets

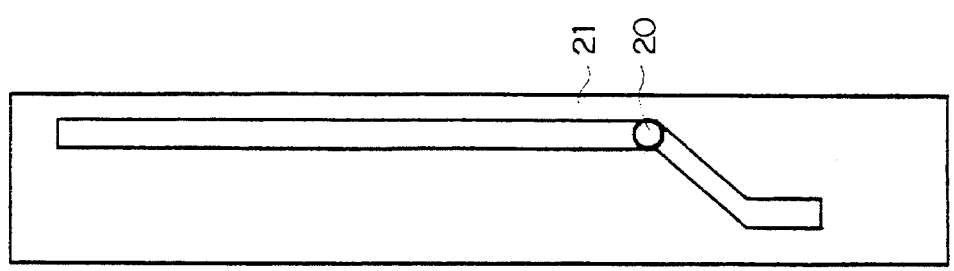
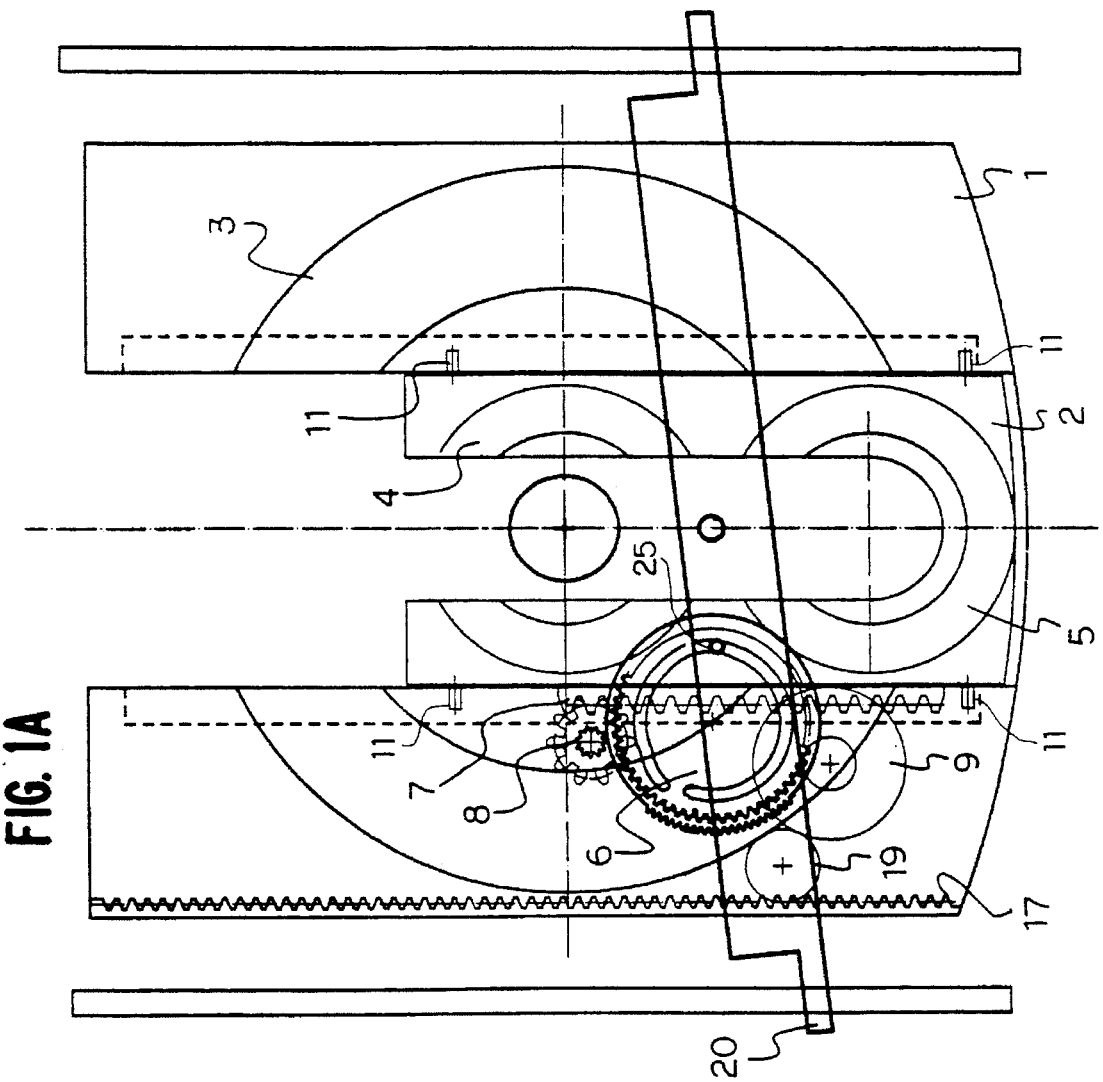
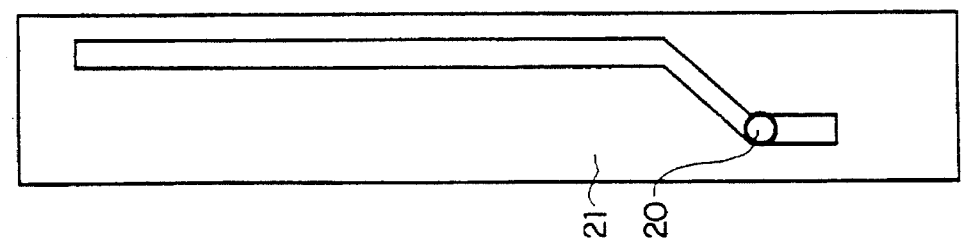

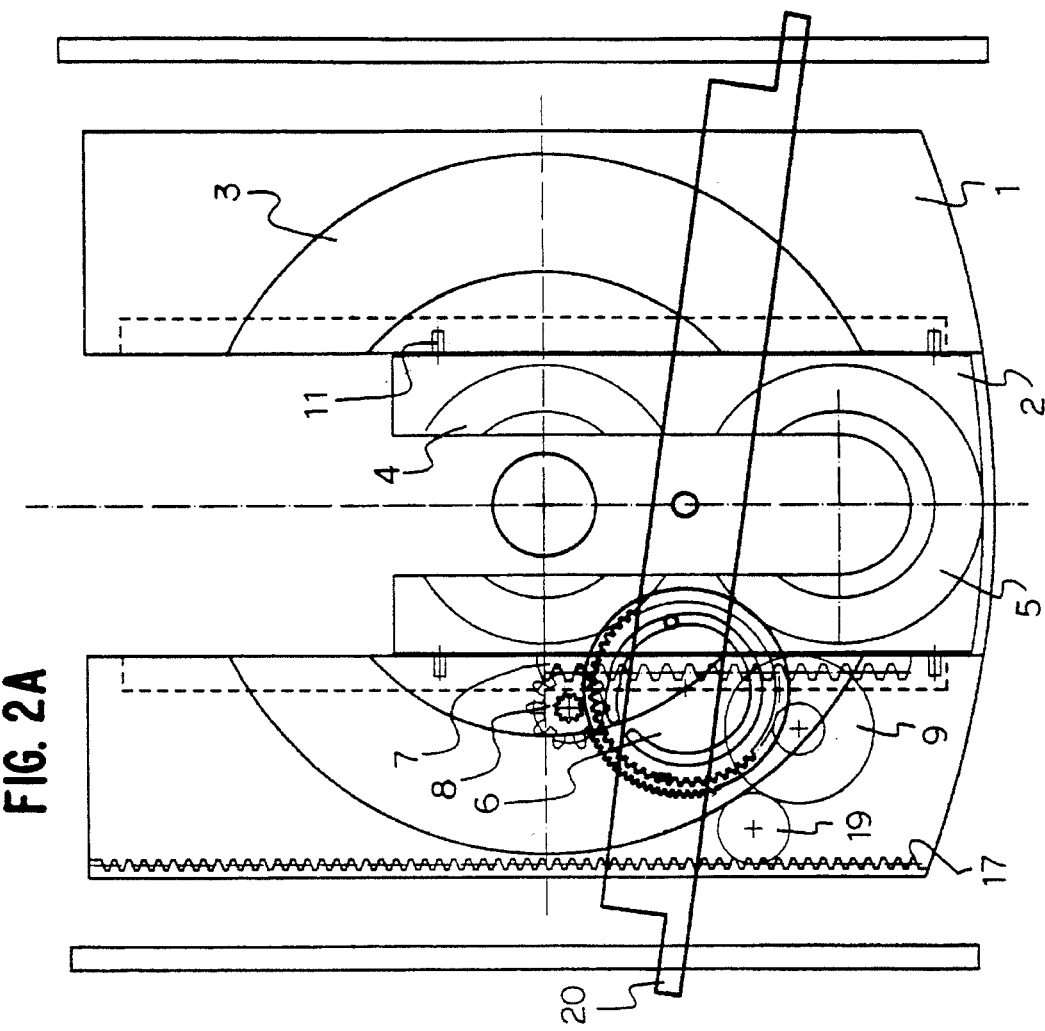

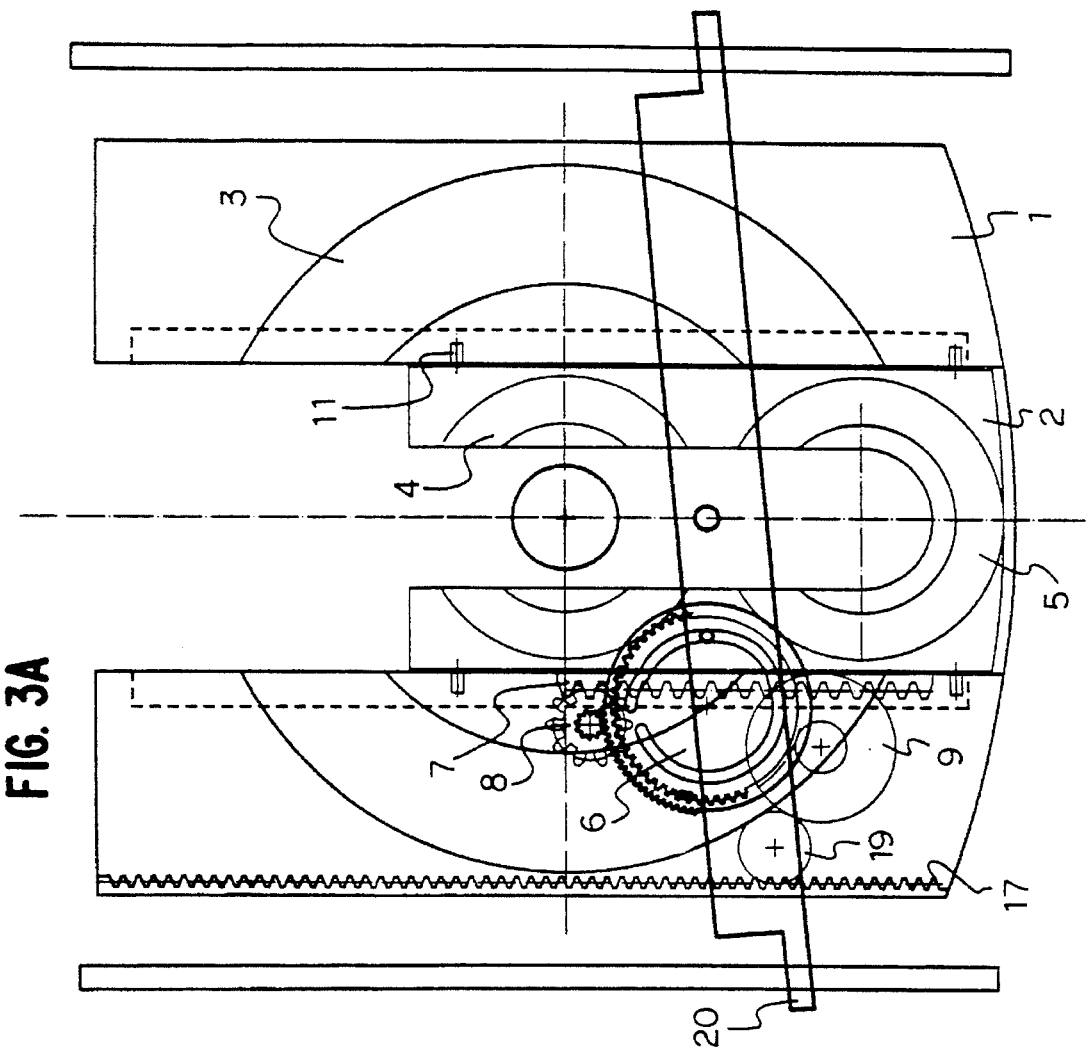

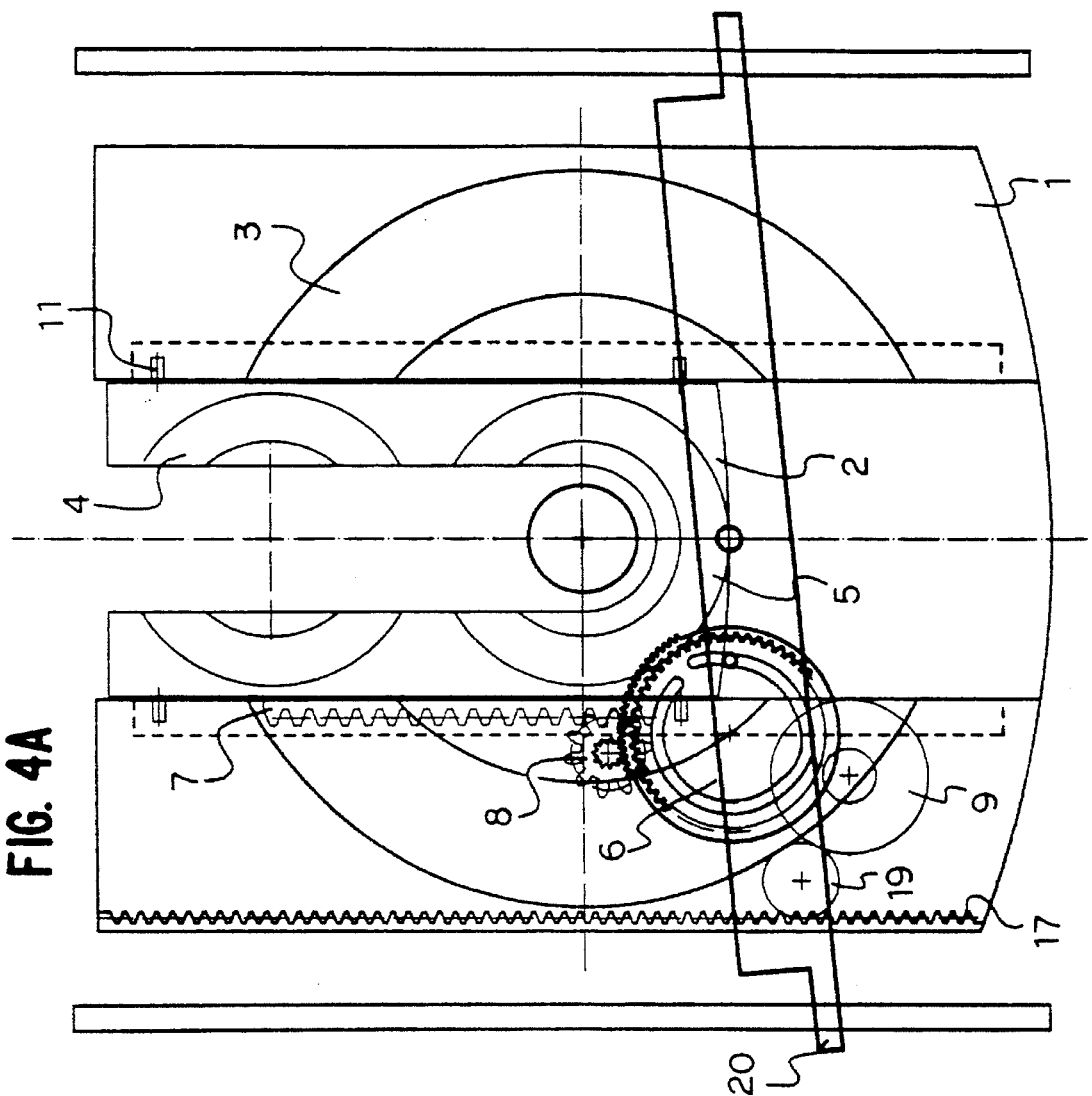

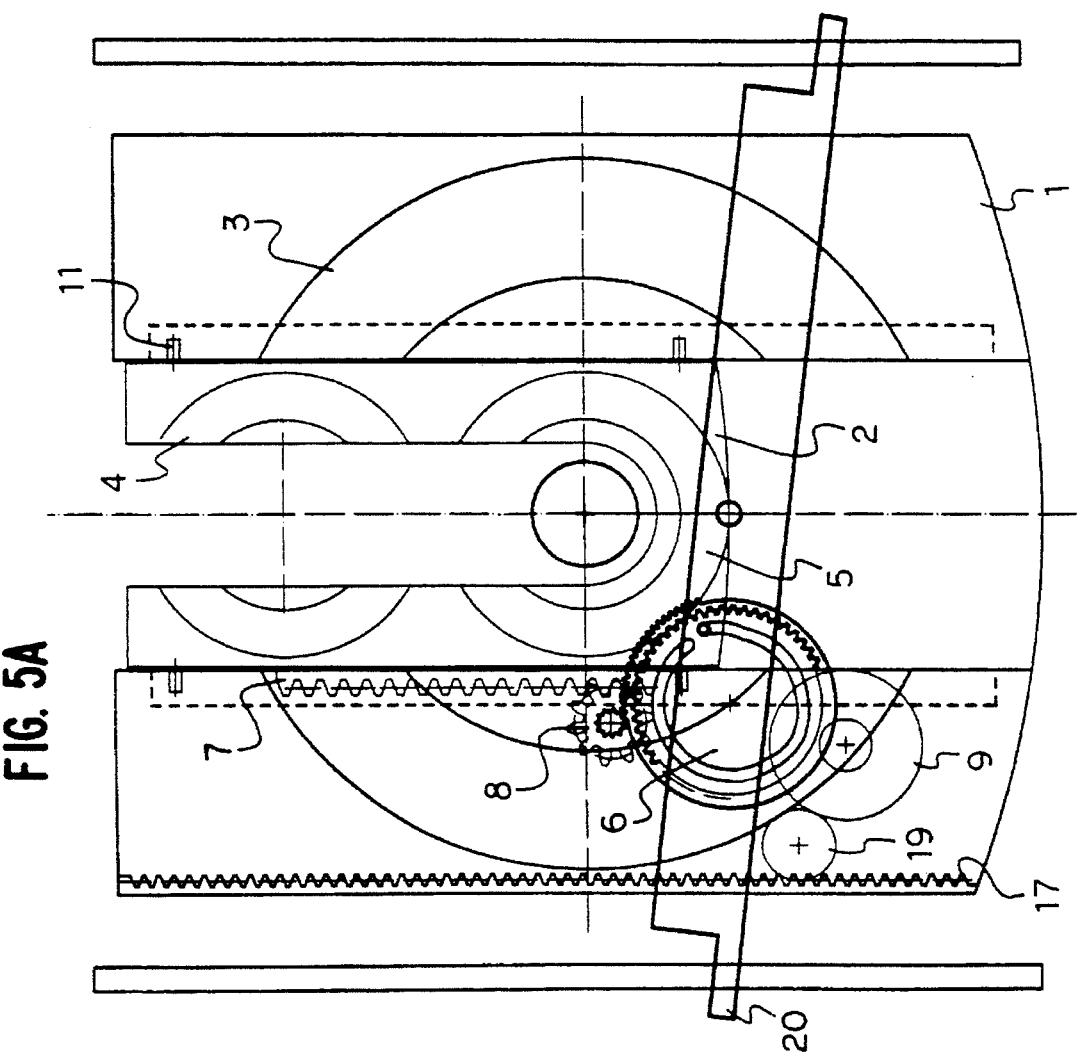

5,497,365

LASER DISC PLAYER CAPABLE OF PLAYING DIFFERENT TYPES OF DISCS

BACKGROUND OF THE INVENTION

1. Field of the Invention

The present invention relates to a laser disc player which can play various discs, and particularly to a laser disc player in which two or more trays are provided in order for two different types of discs to be loaded therein, so that different types of discs can be selectively reproduced. The present disclosure is based upon the disclosure of Korean Patent Application No. 92-16651 filed Sep. 8, 1992 which is incorporated herein by reference.

2. Description of the Related Art

Known front loading type disc players can use 12 cm, 20 cm and 30 cm discs in the same player. Such a laser disc player includes a first tray for loading 20 cm and 30 cm laser discs (LD) and a second tray for loading 8 cm and 12 cm compact discs (CD). When the play mode is selected, the trays are positioned so that one of the pick-up heads for the laser disc and the compact disc is focused on the appropriate disc to reproduce data recorded on the disc.

However, in such a disc player, one tray can be loaded with only one disc, and therefore, only one disc can be played for each tray. When another disc of the same type is to be played, the disc has to be replaced with a new one after ejecting the tray, and the tray must be reloaded before playing. This is inconvenient and time consuming. Further, in case where discs are to be played continuously, a large number of trays are required and therefore, the mechanism can become complex, large and expensive.

SUMMARY OF THE INVENTION

The present invention is intended to overcome the above described disadvantages of conventional devices.

An object of the present invention is to provide a laser disc player in which two types of discs, such as a laser disc player and a compact disc, can be selectively played, and in which a tray can be operated to position the discs proximate a single turntable and pick-up, thereby making it possible to select reproduction of either type of disc in a simple manner.

In achieving the above object, the laser disc player of the present invention has a main tray and includes, a sub-tray coupled to the main tray for loading at least two discs, i.e., first and second compact discs on the main tray and a disc selector for selectively playing the compact discs on the sub-tray. The disc selector moves the sub-tray to position the desired disc proximate a single turntable and pick-up and thus, the selected discs are played by operating the tray in a simple manner.

BRIEF DESCRIPTION OF THE DRAWINGS

The above object and other advantages of the present invention will become more apparent by describing in detail the preferred embodiment of the present invention with reference to the attached drawings in which:

FIG. 1A is a plan view showing a preferred embodiment in a state wherein the trays are raised;

FIGS. 1B and 1C are respective side views of the device illustrated in FIG. 1A;

FIG. 2A is a plan view showing the preferred embodiment in a state after the trays are lowered;

FIGS. 2B and 2C are respective side views of the device illustrated in FIG. 2A;

FIG. 3A is a plan view showing the preferred embodiment in a state after the trays have been elevated again;

FIGS. 3B and 3C are respective side views of the device illustrated in FIG. 3A;

FIG. 4A is a plan view showing the preferred embodiment in a state where the trays are elevated for playing a second CD;

FIGS. 4B and 4C are respective side views of the device illustrated in FIG. 4A;

FIG. 5A is a plan view showing the preferred embodiment in a state after descending the trays when a second CD is positioned for reproduction FIGS. 5B and 5C are respective side views of the device illustrated in FIG. 5A;

DESCRIPTION OF THE PREFERRED EMBODIMENT

Figure 6A:
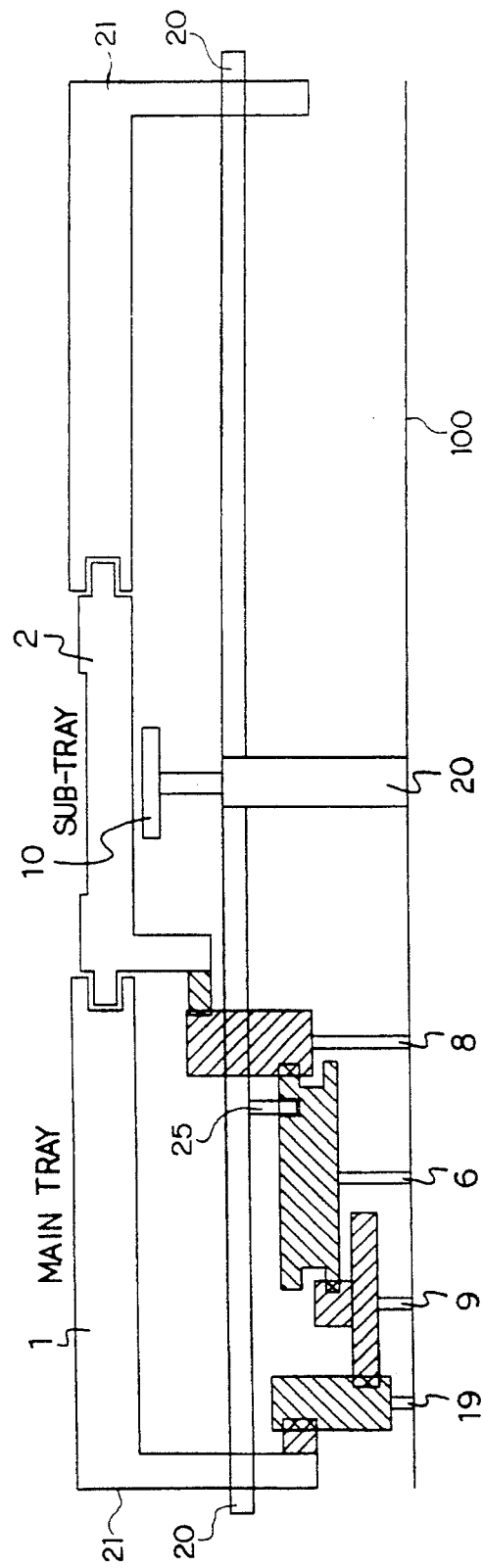
FIG. 6A is a side view, in partial section, showing a state of the preferred embodiment after elevating the trays.

FIG. 1 is a plan view of a disc player according to a first preferred embodiment showing a state when the tray is raised for loading. The disc player is provided with a main tray 1 for loading 20 cm and 30 cm laser discs 3. A sub-tray 2 can receive at least two 8 cm and 12 cm discs, i.e., first and second compact discs 4 and 5. The main tray 1 is slidably coupled to the sub-tray 2.

When compact discs are loaded in sub-tray 2, a disc selector selects one of the first and second compact discs 4 and 5 for reproduction. The sub-tray 2 can be moved to position either one of the compact discs 4 and 5 in opposition to a single turntable so that an optical pick-up can be placed in opposition to one of the discs 4 and 5. The same turntable and optical pick-up are used to reproduce data from a laser disc 3 which can be loaded at the center of the main tray 1.

The disc selector includes a straight sliding rack gear 7 which is mounted on a side of the sub-tray 2, and a pinion gear 8 which is engaged with the rack gear 7. First and second connecting gears 9 and 19 are coupled to a cam gear 6 and are rotatably mounted to a chassis 100 of the device along with the pinion gear 8 (see FIGS. 6A and 6B). Guide pins 11 are provided at four places on both sides of the sub-tray 2, while the main tray 1 has guide grooves formed therein which receive the guide pins 11 to allow the sub-tray 2 to slide with respect to the main tray 1.

That is, in accordance with the revolution of the cam gear 6, which serves as a timing gear, the sub-tray 2 is moved by the cooperation of the pinion gear 8 and the rack gear 7, so that the first compact disc 4 and the second compact disc 5 can be selectively positioned over a turntable 10 (FIGS. 6A and 6B) and played while being positioned at the center of the main tray 1. Another rack gear 17 is formed on the main tray 1. Of course, cam gear 6 is driven by an appropriate drive system which can include a servo motor, or the like.

Side plates 21 are secured to opposing sides of the main tray 1 (see FIGS. 1B, 1C, 6A, 6B). Also, lever 20 is pivotally secured to chassis 100. End portions of the lever 20 are received in slots formed in respective ones of the side plates 21. This structure allows main tray 1, and thus sub-tray 2, to be raised and lowered (into and out of the page in FIG. 1A) merely by causing lever 20 to be pivoted. Pin 25, which is formed on a lower surface of lever 20, is received in a cam groove formed at cam gear 6 (see FIGS. 1A and 6A). Interaction between the groove in cam gear 6 and pin 25 cause lever 20 to swing in a desired manner and thus the raised and lowered states of tray 1 can be controlled based on the rotational position of cam gear 6.

Operation of the disc player of the preferred embodiment will now be described.

FIG. 2A illustrates the preferred embodiment after the trays have been lowered for reproducing data recorded on the first compact disc 4, while FIG. 3A illustrates a state wherein the trays have been elevated prior to, or after playing the first compact disc 4.

As shown in FIGS. 2A and 3A, the main tray 1 and the sub-tray 2 can be ejected from a housing by interaction between gear 19 and rack 17. Further, the laser disc 3 is loaded on the main tray 1, and the first and second compact discs 4 and 5 are loaded on the sub-tray 2. Now, the operations of elevating and descending the sub-tray 2 for playing the first compact disc 4 will be described. When the first compact disc 4 is guided into the laser disc player, the main tray 1 is guided to descend by rotation of the cam gear 6 to swing the lever 20 in the manner described above. Then, data is reproduced from one of the laser disc 3 and the first compact disc 4 by the turntable 10 and an optical pick-up (not shown) in accordance with the preset play mode while the main tray 1 is in the lowered position illustrated in FIGS. 2A and 6B. The main tray 1 can be driven in a manner similar to a conventional deck mechanism of a laser disc player.

Further, if the cam gear 6 is rotated while the main tray is lowered, the tray is elevated by swinging motion of the lever 20 to the position of FIG. 3A. Playback of the laser disc is carried out in the same way as that of the first compact disc 4.

FIG. 4A is a plan view showing a state after raising the main tray 1 for playing the second compact disc 5, while FIG. 5A is a plan view showing a state after lowering the main tray 1 to place the second compact disc 5 on the turntable 10.

When the mode for playing the second compact disc 5 is selected then the cam gear 6 is rotated to elevate the main tray 1 as shown in FIG. 4A. Then the gear 9 is rotated by further rotation of the cam gear 6, and therefore, the sub-tray 2 slides with respect to the main tray 1 by interaction between the pinion gear 8 and the rack gear 7. When the second compact disc 5 is positioned over the turntable 10 after the moving of the sub-tray 2 as shown in FIGS. 4A and 5A, the main tray 1 is made to descend and is secured as shown in FIGS. 5A and 6A, so that the second compact disc 5 can be played. Here, the operation of the lever 20 is same as that of FIGS. 2A and 2B, and therefore further description thereof will be omitted.

Under this condition, when the sub-tray 2 is made to slide by the rack gear 7, the guide pins 11 slide in the guide grooves 12. That is, the sub-tray 2 loaded with two compact discs is made to slide with respect to the main tray 1, and thus, any one of the laser disc 3 and the compact discs 4 and 5 can be selectively played.

Figure 6B:
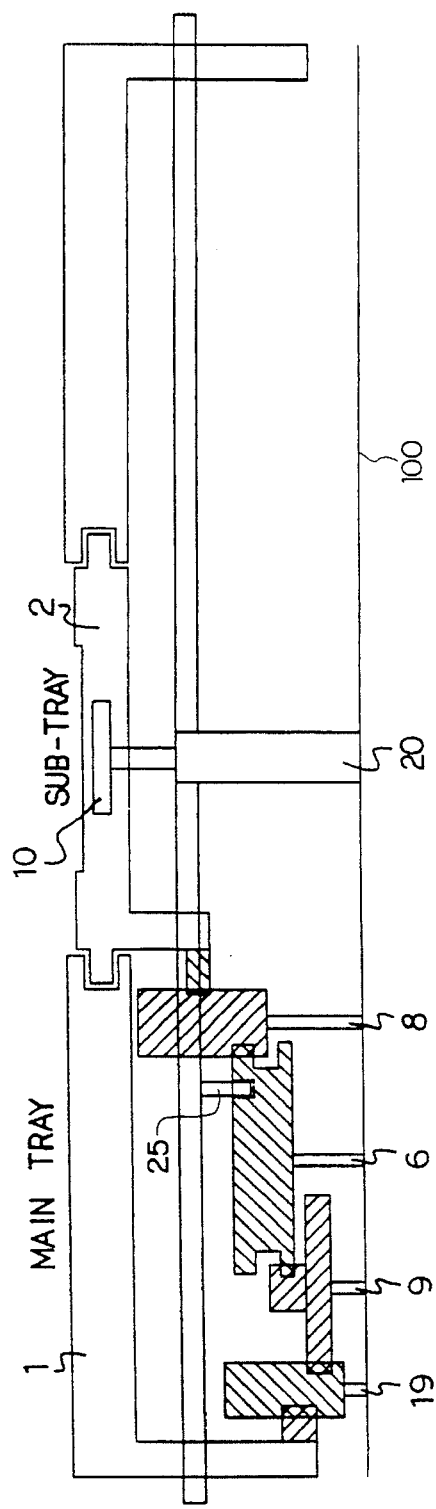
FIG. 6B is a side view, in partial section, showing the preferred embodiment in a state after descending the trays.

FIGS. 6A and 6B are side views showing states after elevating and descending the main tray according to the present invention.

As shown in FIG. 6A, when a motor (not shown) is driven, the cam gear 6 is driven, and the sub-tray 2 is made to elevate in the manner described above. On the other hand, in FIG. 6B, the cam gear 6 swings the lever 20 to make the main tray 1 descend. In this case, the sub-tray 2 is placed on the turntable 10.

Figure 7:
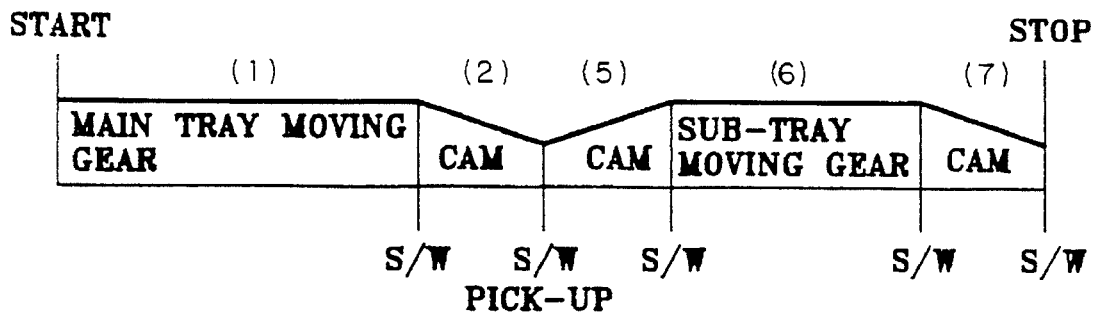
FIG. 7 illustrates a sequence of the basic operation of a cam gear according to the preferred embodiments.
Figure 8:
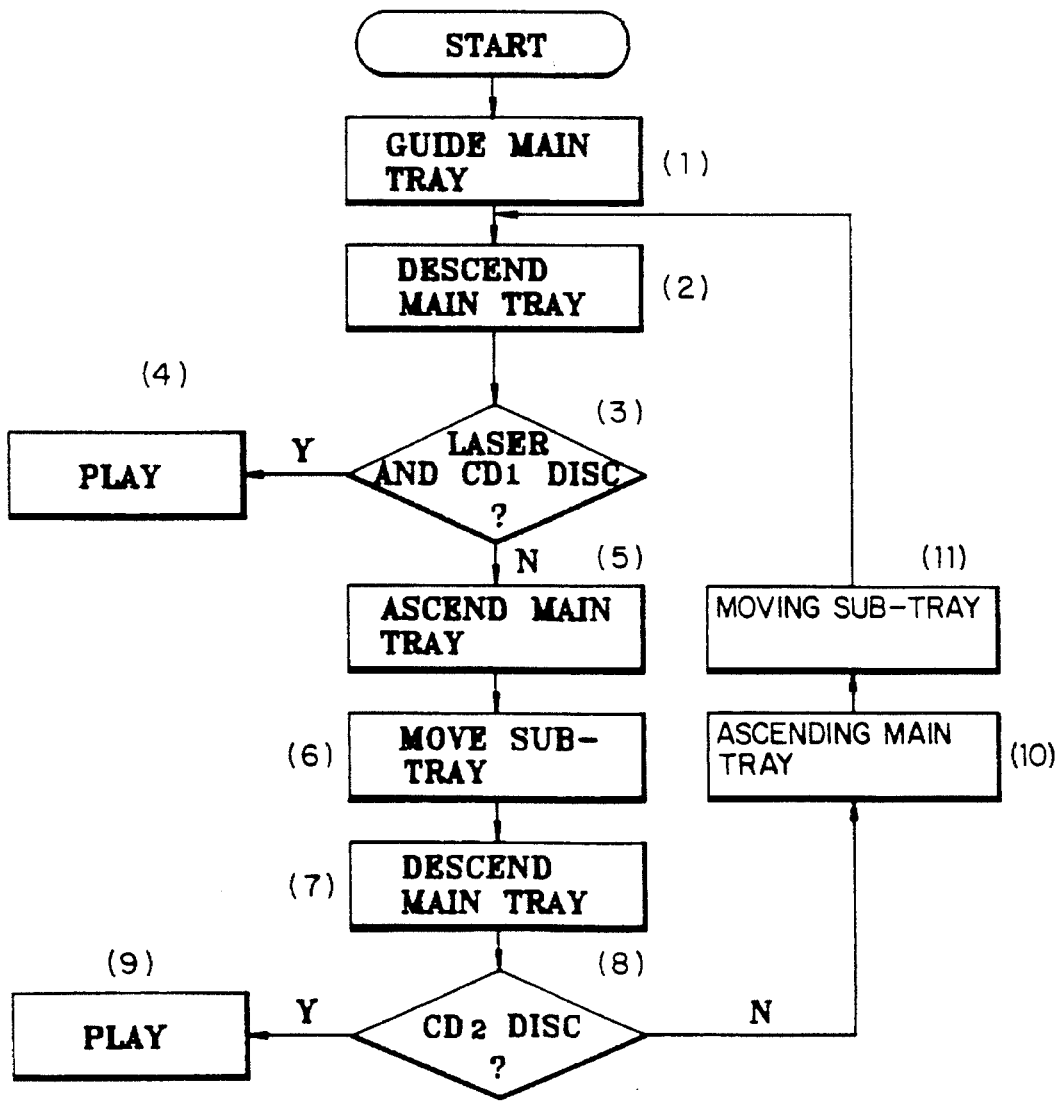
FIG. 8 is a flow chart showing the operation of the preferred embodiment.

Now, the overall control and timing of the preferred embodiment will be described referring to the flow charts of FIGS. 7 and 8.

After the discs are loaded, the main tray 1 is guided by the deck mechanism (step 1). Then the main tray 1 is lowered, and the preset reproduction mode is carried out by selecting the laser disc 3 or the first compact disc 4 (steps 2 and 3). When the pick-up is focused, the laser disc 3 or the first compact disc 4 is rotated for reproduction (step 4).

Under this condition, the sub-tray 2 moves together with the main tray 1. The focus of the pick-up is adjusted accordingly based on whether the laser disc 3 or the first compact disc 4 is selected.

Meanwhile, if the second compact disc 5 is selected at the beginning or during performing the play mode of the laser disc 3 or the first compact disc 4, then the main tray 1 is made to elevate by the cam gear 6 (step 5). Then the rack gear 7 is moved by the pinion gear 8 to move the sub-tray 2 relative to the main tray 1, and, when the second compact disc 5 is positioned over the turntable 10, the main tray 1 is made to descend by the cam gear 6 (steps 6 and 7). Then, a focus is accomplished on the second compact disc 5, and the disc 5 is rotated and played in a known manner (steps 8 and 9).

If one of the first compact disc and the laser disc are selected for play at this time, the main tray is raised and the sub-tray is moved back to the appropriate position (steps 10 and 11) and control is resumed at step 2.

When the sub-tray 2 moves, the guide pins 11 are made to slide along the guide grooves 12 of the main tray 1. The above operating sequence can be varied in accordance with the operating methods of the laser disc player.

According to the embodiment as described above, the sub-tray is made to slide on the main tray, and thus the sub-tray can load two or more compact discs on the same turntable. Further, by using a turntable and a pick-up, a laser disc or two or more compact discs can be selectively played with simple sliding motions of the sub-tray. Therefore, a plurality of discs can be selectively played in a simple manner.

Teeth are formed over predetermined intervals of the cam gear 6 to selectively slide the trays. However, the sliding motion of the trays can be accomplished through separate motors and drive systems. Also, control of the disc player can be accomplished by a known microprocessor based device coupled to appropriate sensors and drive devices. Finally, the sub-tray may be capable of receiving any number of various formats of discs.

What is claimed is:

1. A disc player capable of reproducing a first disc loaded on a main tray, said player comprising:

a sub-tray for supporting at least two second discs, said subtray being slidably mounted on said main tray;

a rack gear mounted on a side of said sub-tray;

a pinion gear meshed with said rack gear;

a cam gear meshed with said pinion gear, rotation of said cam gear causing said sub-tray to slide relative to said main tray, a groove being formed in said cam gear;

a lever pivotally mounted on said main tray;

at least one side plate having a slot formed therein, a portion of said lever being slidably disposed in said slot; and a pin formed on said lever and engaged in said groove, whereby rotation of said cam gear causes said lever to pivot so that said portion moves along said slot to move said main tray towards or away from a playing position and sequentially slide said main tray and said sub-tray in response to rotation of said cam gear.

2. The disc player as claimed in claim 1, wherein said cam gear comprises two circular plates with teeth formed on outer peripheral surfaces of said plates.

3. The disc player as claimed in claim 1, wherein said first disc and said at least two second discs are played by a turntable and a pick-up.

4. The disc player as claimed in claim 1, further comprising:

guide pins extending from said sub-tray and engaged in guide grooves of said main tray to guide said sub-tray as it slides with respect to said main tray.

5. A disc player as claimed in claim 1, wherein said first disc is a laser disc (LD) and said second discs are compact discs (CD).

* * * * *